April 21, 1936.  G. L. USSELMAN  2,037,837
MERCURY VAPOR RECTIFIER
Filed July 27, 1933   2 Sheets-Sheet 1

INVENTOR
G. L. USSELMAN
BY
ATTORNEY

Patented Apr. 21, 1936

2,037,837

UNITED STATES PATENT OFFICE 2,037,837

MERCURY VAPOR RECTIFIER

George Lindley Usselman, Port Jefferson, N. Y., assignor to Radio Corporation of America, a corporation of Delaware Application July 27, 1933, Serial No. 682,385

6 Claims. (Cl. 175—363)

This invention relates to improvements in rectifier circuits, and particularly those circuits as are associated with rectifiers of the mercury vapor type.

An object of this invention is to simplify and improve rectifier circuits generally.

Another object of this invention is to provide an improved rectifier circuit which substantially reduces the number of equalizing reactors, thereby reducing the cost of the rectifier, and also a substantial saving in the space which would be taken up by the additional equalizing reactors.

Rectifiers of the mercury vapor type have previously employed equalizing reactors for each pair of tubes in their circuits whenever it was necessary to use two or more rectifier tubes operating in parallel so as to equalize the current in each one of the rectifier tubes; otherwise one of the rectifier tubes of a pair would tend to carry all of the current and the other rectifier tube would carry little or no current. The reason for operating rectifier tubes in parallel is that it is sometimes necessary to increase the current rating of the rectifier using mercury vapor tubes without increasing the voltage rating. Therefore, it may be more economical to operate two tubes of the same rating in parallel instead of using single tubes of a higher rating. However, by my invention I am able to eliminate half the number of equalizing reactors. To accomplish this I use a different method of connecting the plate transformer to the rectifier tubes.

The invention consists of the apparatus commonly employed and combined with a new and unique circuit arrangement to reduce the number of equalizing reactors, as shown and described in the accompanying drawings and following description.

In the drawings, Fig. 1 shows a 12-tube mercury vapor rectifier circuit which illustrates the specific embodiment of the circuit arrangement of my invention as applied to a three-phase plate supply.

Figure 2:
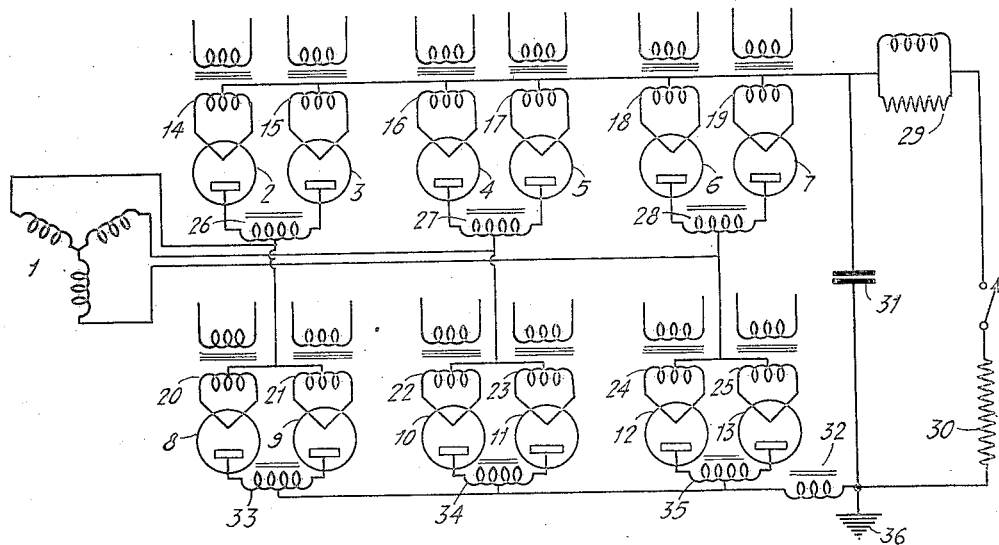
Fig. 2 shows the standard 12-tube mercury vapor rectifier circuit arrangement of the prior art.
Figure 1:
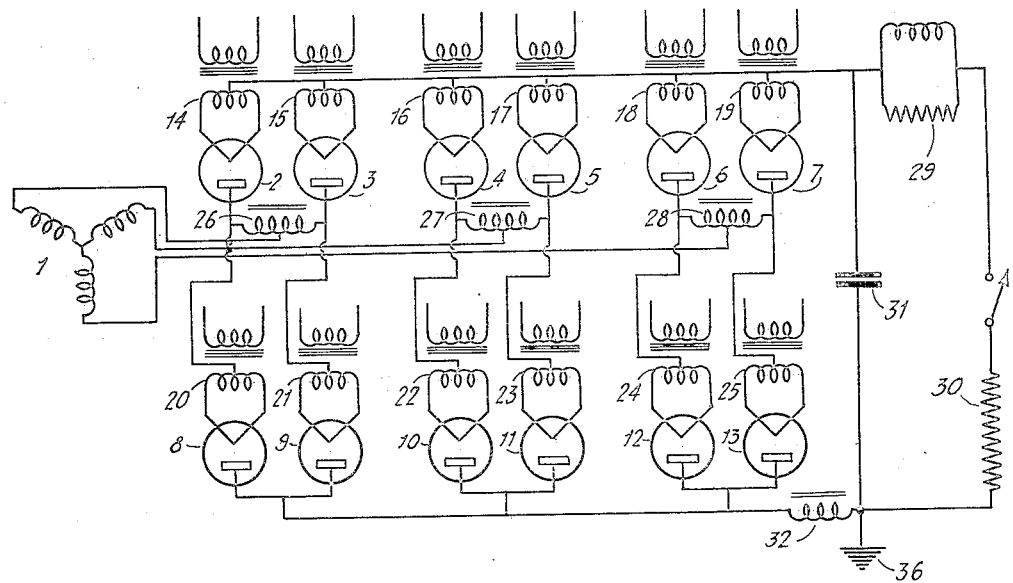
Figure 4:
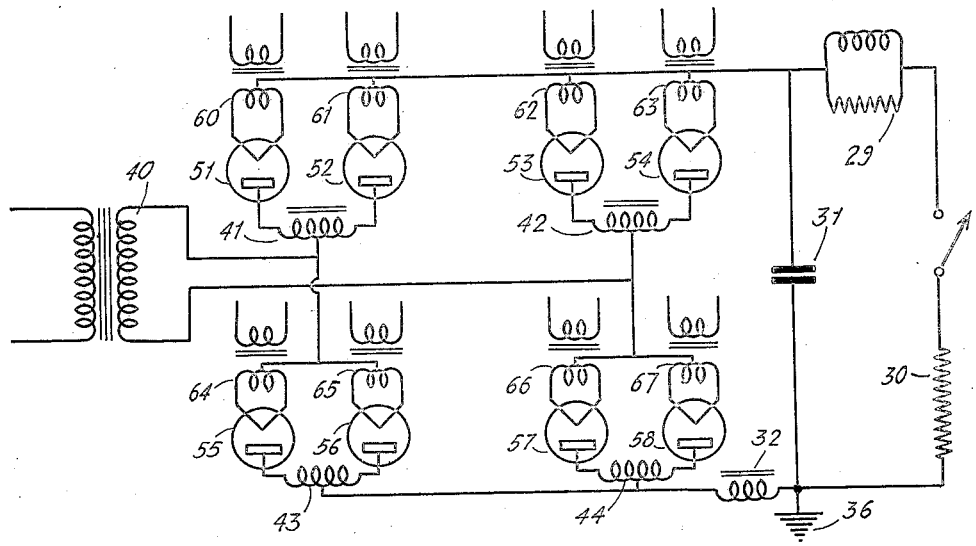
Fig. 4 shows a standard 8-tube mercury vapor rectifier circuit arrangement of the prior art as applied to a single-phase plate supply.
Figure 3:
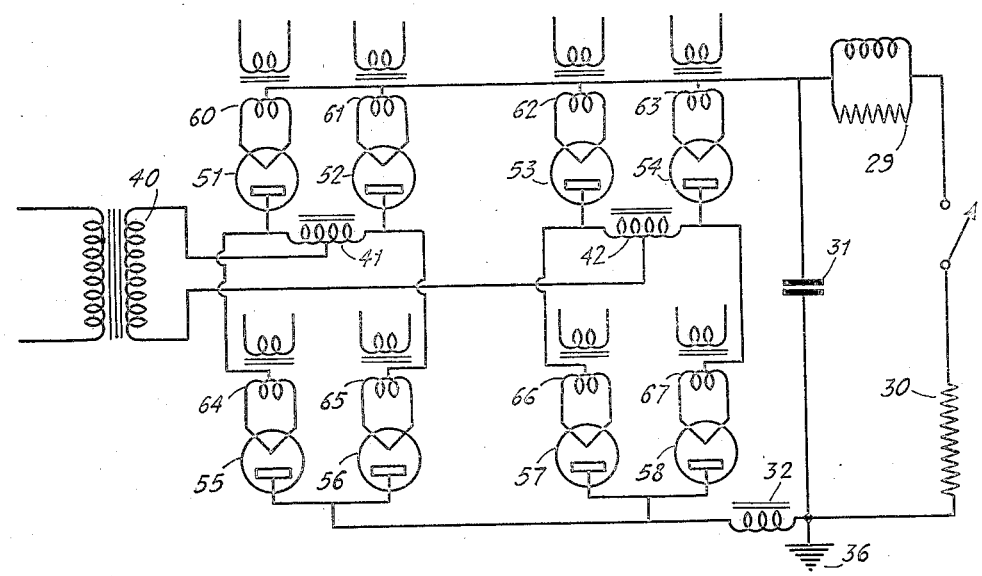
Fig. 3 shows an 8-tube mercury rectifier circuit arrangement of my invention as applied to a single-phase plate supply.

It will readily be seen by comparing Fig. 1 with Fig. 2 and also Fig. 3 with Fig. 4, that by my improved circuit arrangements as shown by Fig. 1 and 3 I am able to eliminate one-half the number of equalizing reactors.

Referring now in detail to Fig. 1 of the drawings, the source of energy is supplied from the three-phase power transformer 1 to the rectifier tubes 2, 3, 4, 5, 6, 7, 8, 9, 10, 11, 12 and 13 which are grouped in pairs. The filaments of the rectifier tubes are heated by the transformers 14, 15, 16, 17, 18, 19, 20, 21, 22, 23, 24 and 25. The anodes of the high voltage rectifier tubes 2, 3, 4, 5, 6 and 7 are each connected to the mid-point of the transformer secondary supplying the low voltage tubes 8, 9, 10, 11, 12 and 13 across the anodes of the former tubes 2 to 7 inclusive an equalizing reactor is connected. The three equalizing reactors are designated by the numerals 26, 27 and 28. A keying filter is designated by numeral 29. There is also shown a rectifier load resistance 30, a smoothing condenser 31, and a peak current limiting reactor 32, to protect the tubes against high peak currents which if allowed to flow would soon destroy the tubes.

In Figs. 2, 3 and 4 the same general numerals apply. However, it will be noted that in Fig. 2 there are three additional equalizing reactors 33, 34 and 35, and in Fig. 4 there are also shown two additional equalizing reactors 43 and 44. In Figs. 1, 2, 3 and 4 for simplifying the diagrams, other extraneous circuits have been omitted as these are well known and used in the standard practice of rectifier circuits. As it is clearly shown in Fig. 1 that by using a different method of connecting the plate transformer to the tubes than is shown by Fig. 2, I have been able to accomplish the same results and eliminate the necessity of three of the equalizing reactors. To accomplish this the following changes have been made from that of the standard practice.

The upper left-hand pair of rectifier tubes, numbered 2 and 3, are the high voltage pair. The lower rectifier tubes, numbered 8 and 9, are the low voltage pair. It will be noted in Fig. 1 that to eliminate the equalizing reactor 33 associated with the plate of tubes 8 and 9, that the center tap of the filament transformer for rectifier tube 8 is connected to the plate of rectifier tube 2, and the center tap of the filament transformer for rectifier tube 9 is connected to the plate of rectifier tube 3. Across the interconnection lines of the above mentioned tubes there is connected the equalizing reactor 26 which is the same as connecting the equalizing reactor between the plates of the high voltage rectifier tubes 2 and 3 or connecting it between the filament transformer center tap of the low voltage rectifier tubes 8 and 9. It will be noted that the center tap of this latter equalizing reactor is connected to one leg of the three-phase plate plate transformer secondary. The above circuit changes described with regard to the rectifier tubes 2 and 3, and 8 and 9 also apply for the other eight tubes 4, 5, 6, 7, 10, 11, 12 and 13, as is shown by Fig. 1.

In the two-phase power supply circuit arrangement as shown by Fig. 3 of the drawings the source of energy is supplied by the transformer 40, the secondary of which is connected to the rectifier tubes 51, 52, 53, 54, 55, 56, 57 and 58 which are grouped in pairs as shown. The filaments of these tubes are heated by the transformers 60, 61, 62, 63, 64, 65, 66 and 67. The anodes of the high voltage rectifier tubes 51, 52, 53 and 54 are each connected to the mid point of the filament heating transformer secondary supplying the low voltage tubes 55, 56, 57 and 58. Across the anode of the former tubes 51 to 54 inclusive, an equalizing reactor is connected. These two equalizing reactors are designated by the numerals 41 and 42. Other units connected in the circuit are the keying filter 29, rectifier load resistance 30, smoothing condenser 31, and peak current limiting reactor 32, all of which are mentioned above with reference to Fig. 1.

Fig. 4 shows a similar circuit arrangement as that of Fig. 3 except for the inclusion of the additional equalizing reactors 43 and 44 which is the ordinary standard circuit arrangement.

While only two particular types of rectifier circuits are shown, it is to be distinctly understood however, that the invention will also apply to other circuit arrangements and is not to be limited to the specific circuits described, but only by the scope of the appended claims.

What I claim is:

1. In a rectifier circuit comprising a plurality of rectifier tubes, a separate filament heating transformer with a center tap secondary for each of said rectifier tubes, a plurality of center tap equalizing reactors, each having its ends connected respectively to the plates of a pair of rectifier tubes and also to the center taps of separate filament heating transformer secondaries of another pair of rectifier tubes, the center tap of each of said equalizing reactors being connected to a transformer plate supply.

2. In combination with a rectifier circuit including a plurality of rectifier tubes, a separate heating transformer with a center tap secondary for each of said rectifier tubes, a three-phase transformer plate supply, three center tap equalizing reactors, each having its center tap connected respectively to a leg of said three-phase transformer, the ends of the winding of each equalizing reactor being connected respectively to the plates of a pair of rectifier tubes and also to the center taps of filament heating transformer secondaries of another pair of rectifier tubes.

3. In combination with a rectifier circuit including a plurality of rectifier tubes, a separate heating transformer with a center tap secondary for each of said rectifier tubes, a single-phase transformer plate supply, two center tap equalizing reactors, each having its center tap connected respectively to a leg of said single-phase transformer, the ends of the winding of each equalizing reactor being connected respectively to the plates of a pair of high voltage rectifier tubes and also to the center taps of filament heating transformer secondaries of two low voltage rectifier tubes.

4. In combination with a rectifier circuit including a plurality of rectifier tubes, a separate heating transformer with a center tap secondary for each of said rectifier tubes, a three-phase transformer plate supply, three center tap equalizing reactors, each having its center tap connected respectively to each leg of said three-phase transformer, the ends of the winding of said equalizing reactor being connected respectively to the plates of a pair of high voltage rectifier tubes and also to the center taps of separate filament heating transformer secondaries of a low voltage pair of rectifier tubes, and a filter associated with said circuit comprising a keying filter, a rectifier load circuit and a smoothing condenser.

5. In combination with a rectifier circuit including a plurality of rectifier tubes, a seperate heating transformer with a center tap secondary for each of said rectifier tubes, a single-phase transformer plate supply, two center tap equalizing reactors each having its center tap connected to the secondary of said single-phase transformer, the ends of the windings of said equalizing reactors being connected respectively to the plates of two pairs of high voltage rectifier tubes and also to the center taps of separate filament heating transformer secondaries of two pairs of low voltage rectifier tubes, and a filter associated with said circuit comprising a keying filter, a rectifier load circuit and a smoothing condenser.

6. In combination with a rectifier circuit including a plurality of rectifier tubes, a separate heating transformer with a center tap secondary for each of said rectifier tubes, a single phase transformer plate supply, and two center tap equalizing reactors, each having its center tap connected to the secondary of said single phase transformer, the ends of the windings of said equalizing reactors being connected respectively to the plates of two pairs of rectifier tubes and also to the center taps of separate filament heating transformer secondaries of two other pairs of rectifier tubes, a filter associated with said circuit comprising a keying filter, a rectifier load circuit, and a smoothing condenser.

GEORGE LINDLEY USSELMAN.